(12) United States Patent
Chen et al.

(10) Patent No.: US 11,958,200 B2
(45) Date of Patent: Apr. 16, 2024

(54) AUTOMATIC ROBOTIC ARM SYSTEM AND COORDINATING METHOD FOR ROBOTIC ARM AND COMPUTER VISION THEREOF

(71) Applicant: Delta Electronics, Inc., Taoyuan (TW)

(72) Inventors: Hung-Hsin Chen, Taoyuan (TW); Chia-Jun Yu, Taoyuan (TW); Qi-Ming Huang, Taoyuan (TW); Chin-Lun Chang, Taoyuan (TW); Keng-Ning Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 331 days.

(21) Appl. No.: 17/563,976

(22) Filed: Dec. 28, 2021

(65) Prior Publication Data

US 2023/0097932 A1    Mar. 30, 2023

(30) Foreign Application Priority Data

Sep. 30, 2021   (CN) .......................... 202111162843.8

(51) Int. Cl.
*B25J 9/16*   (2006.01)
*B25J 11/00*  (2006.01)
*B25J 13/08*  (2006.01)

(52) U.S. Cl.
CPC ........... *B25J 9/1692* (2013.01); *B25J 9/1653* (2013.01); *B25J 9/1664* (2013.01); *B25J 9/1674* (2013.01);
(Continued)

(58) Field of Classification Search
USPC ................................................. 700/245–264
See application file for complete search history.

(56) References Cited

U.S. PATENT DOCUMENTS 3,837,726 A * 9/1974 Suzuki ..................... G03H 1/00
396/138
5,361,217 A * 11/1994 Makimura ............. G01C 15/00
356/3
(Continued)

FOREIGN PATENT DOCUMENTS

CA         3067515 A1 *  9/2020   ............. B23K 26/04
CN       110599541 A  * 12/2019   ............. G01S 7/497
(Continued)

OTHER PUBLICATIONS

H. Liu, Y. Zhang, K. Sun, S. Fan and J. Chen, "Pose measurement of robot arm end based on laser range finders, " 2015 IEEE International Conference on Advanced Intelligent Mechatronics (AIM), Busan, Korea (South), 2015, pp. 1224-1228, doi: 10.1109/AIM.2015.7222706. (Year: 2015).*

(Continued)

*Primary Examiner* — Jonathan L Sample
*Assistant Examiner* — James Miller Watts, III
(74) *Attorney, Agent, or Firm* — Chun-Ming Shih; HDLS IPR SERVICES

(57) ABSTRACT

An automatic robotic arm system and a coordinating method for robotic arm and computer vision thereof are disclosed. A beam-splitting mirror splits an incident light into a visible light and a ranging light and respectively guides to an image capturing device and an optical ranging device arranged in the different reference axes. In a calibration mode, a transformation relation is computed based on a plurality of the calibration postures and corresponding calibration images. In an operation mode, a mechanical space coordinate is determined based on an operation image and the transformation relation, and the robotic arm is controlled to move based on the mechanical space coordinate.

20 Claims, 12 Drawing Sheets

(52) U.S. Cl.
CPC ........... *B25J 9/1697* (2013.01); *B25J 11/005* (2013.01); *B25J 13/089* (2013.01)

(56) References Cited

U.S. PATENT DOCUMENTS

| | | | | |
|---|---|---|---|---|
| 6,320,641 | B1* | 11/2001 | Bauer | H04N 23/56 |
| | | | | 348/E5.029 |
| 9,046,751 | B2* | 6/2015 | Wang | G03B 21/204 |
| 9,221,176 | B2* | 12/2015 | Suzuki | B25J 9/1697 |
| 10,466,044 | B2* | 11/2019 | Choiniere | G01C 3/08 |
| 11,628,510 | B2* | 4/2023 | Ding | G02B 27/141 |
| | | | | 219/121.6 |
| 11,648,678 | B2* | 5/2023 | Rostrup | G01C 25/00 |
| | | | | 700/254 |
| 2011/0218675 | A1 | 9/2011 | Ban et al. | |
| 2011/0280472 | A1* | 11/2011 | Wallack | G06T 7/80 |
| | | | | 382/153 |
| 2013/0101155 | A1* | 4/2013 | Jelinek | H04N 25/71 |
| | | | | 382/103 |
| 2014/0168613 | A1* | 6/2014 | Wang | G03B 21/204 |
| | | | | 353/31 |
| 2014/0368615 | A1* | 12/2014 | van Baar | G01S 17/894 |
| | | | | 382/154 |
| 2015/0138325 | A1* | 5/2015 | Seo | G01S 7/4812 |
| | | | | 348/49 |
| 2015/0316351 | A1* | 11/2015 | Choiniere | F41G 1/545 |
| | | | | 42/111 |
| 2017/0143429 | A1* | 5/2017 | Richmond | A61B 34/37 |
| 2021/0001423 | A1* | 1/2021 | Boillot | G06T 7/80 |
| 2022/0066456 | A1* | 3/2022 | Ebrahimi Afrouzi | |
| | | | | A47L 9/2873 |
| 2022/0097234 | A1 | 3/2022 | Huang et al. | |
| 2022/0101511 | A1* | 3/2022 | Emtman | G01B 11/272 |
| 2022/0392012 | A1* | 12/2022 | Terry | A61B 3/13 |
| 2023/0228882 | A1* | 7/2023 | Volfson | G01S 7/481 |
| | | | | 356/5.01 |
| 2023/0359012 | A1* | 11/2023 | Spink | G02B 21/245 |

FOREIGN PATENT DOCUMENTS

| | | | |
|---|---|---|---|
| DE | 102011009814 A1 | 9/2011 | |
| JP | H-0631666 A * | 2/1994 | ............. B25J 13/08 |
| JP | H0631666 A | 2/1994 | |
| JP | 2015182144 A | 10/2015 | |
| TW | 202102347 A | 1/2021 | |
| TW | I724977 B | 4/2021 | |
| TW | 202124110 A | 7/2021 | |

OTHER PUBLICATIONS

Yida, "What is a Time of Flight Sensor and How does a ToF Sensor work?" Retrieved from https://web.archive.org/web/20200808124411/ https://www.seeedstudio.com/blog/2020/01/08/what-is-a-time-of-flight-sensor-and-how-does-a-tof-sensor-work/# (Year: 2020).*

* cited by examiner

AUTOMATIC ROBOTIC ARM SYSTEM AND COORDINATING METHOD FOR ROBOTIC ARM AND COMPUTER VISION THEREOF

BACKGROUND

Technical Field

The technical field relates to a robotic arm, and more particularly relates to an automatic robotic arm system and a coordinating method of robotic arm and computer vision thereof.

Description of Related Art

A robotic arm system of the related art is configured to capture an image of an operation target by a camera, determine a position of the operation target by an image analysis, and control a robotic arm to move to the position of the operation target to process the operation target.

Some disadvantages of the robotic arm system of the related art are listed below. When the robotic arm and the camera are arranged in a coaxial arrangement of top and bottom, an operable space of the robotic arm is significantly reduced, such that an upper limit of the camera's allowable volume is restricted.

When the robotic arm and the camera are arranged in a non-coaxial arrangement, an offset may exist between a flange axis of the robotic arm and a capturing optical axis of the camera. The above-mentioned offset causes random errors between a visual space with respect to the capturing optical axis and a mechanical space with respect to the flange axis, such that the robotic arm system is unable to control the robotic arm precisely through computer vision.

Thus, the existing robotic arm system has the above-mentioned problems and needs a more effective solution.

SUMMARY

The present disclosed example is direct to an automatic robotic arm system and a coordinating method of robotic arm and computer vision having the ability to overlap a capturing optical axis and a flange axis, measure a target distance, and coordinate the robotic arm with the computer vision.

In one of the embodiments, a coordinating method of coordinating for a robotic arm and a computer vision includes: a) in a calibration mode, controlling the robotic arm to pose a plurality of calibration postures in an effective capturing zone of an image capturing device based on a target distance measured by an optical ranging device, and capturing a plurality of calibration images through the image capturing device for the calibration postures, wherein a beam-splitting mirror is configured to guide a visible light to the image capturing device arranged outside a flange axis of the robotic arm, and guide a ranging light to the optical ranging device, and a ranging axis of the optical ranging device is parallel or overlapped with the flange axis; b) computing a transformation relation between a visual space of the image capturing device and a mechanical space of the robotic arm based on the calibration postures and the calibration images; c) in an operation mode, capturing an operation image through the image capturing device, and determining a mechanical space coordinate for performing operation based on the operation image and the transformation relation; and, d) controlling the robotic arm to move to the mechanical space coordinate.

In one of the embodiments, an automatic robotic arm system, includes a robotic arm, an image capturing device, an optical ranging device, an optical path structure, and a control device. The robotic arm is used to move in a 3D space. The image capturing device is arranged outside of a flange axis of the robotic arm and used to capture images. The optical ranging device is arranged on the robotic arm and used to measure a target distance, wherein a ranging axis of the optical ranging device is parallel to or overlaps the flange axis. The optical path structure includes a beam-splitting mirror used to guide a visible light to the image capturing device and guide a ranging light to the optical ranging device. The control device is connected to the robotic arm, the image capturing device and the optical ranging device. The control device is configured in a calibration mode to control the robotic arm to pose a plurality of calibration postures in an effective capturing zone of the image capturing device based on the target distance, control the image capturing device to capture a plurality of calibration images for the calibration postures, compute a transformation relation between a visual space of the image capturing device and a mechanical space of the robotic arm based on the calibration postures and the calibration images. The control device is configured in an operation mode to control the image capturing device to capture an operation image, and determine mechanical space coordinates for performing operation based on the operation image and the transformation relation, and control the robotic arm to move to the mechanical space coordinates.

The present disclosure may make the capturing optical axis overlap the flange axis of the robotic arm, and improve the coordination between the robotic arm and the computer vision.

BRIEF DESCRIPTION OF THE DRAWINGS

The features of the present disclosure are believed to be novel are set forth with particularity in the appended claims. The present disclosure itself, however, may be best understood by reference to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 12:
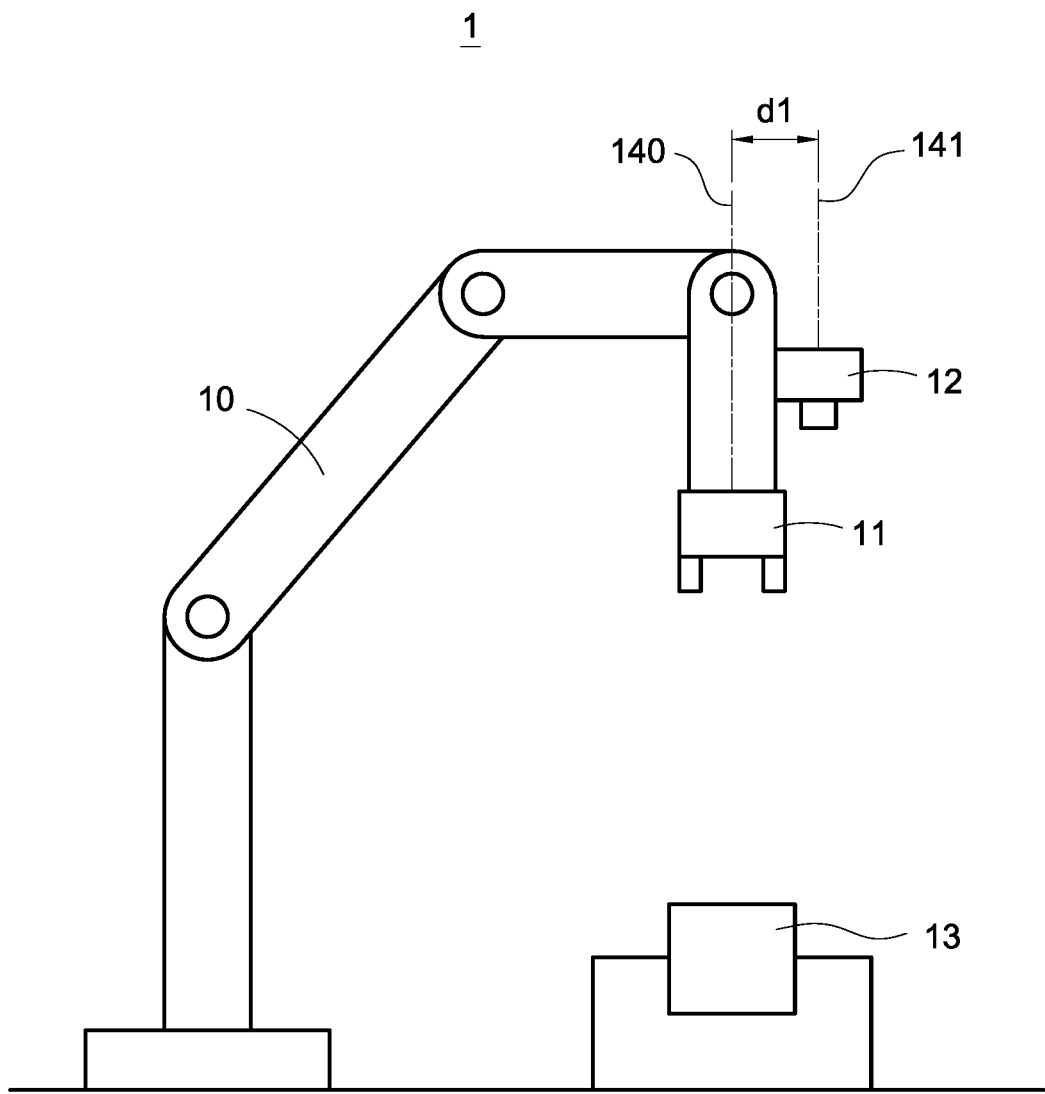
FIG. 12 is a setup schematic view of an automatic robotic arm system of the related art.
Figure 13:
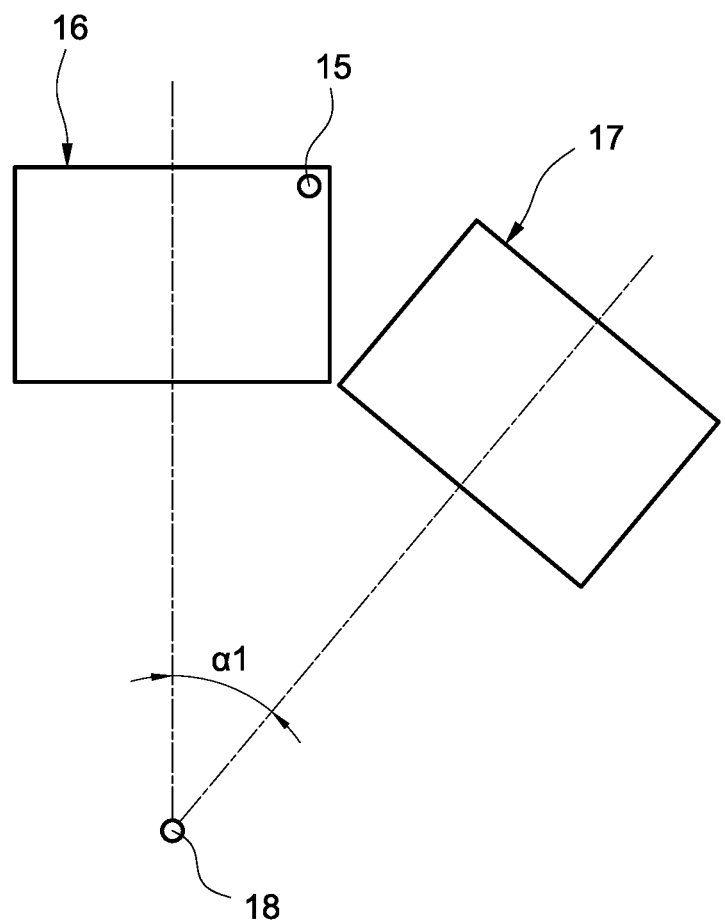
FIG. 13 is a schematic view of a visual field of an automatic robotic arm system of the related art.

Please refer to FIG. 12 and FIG. 13, FIG. 12 is a setup schematic view of an automatic robotic arm system of the related art, and FIG. 13 is a schematic view of a visual field of an automatic robotic arm system of the related art.

As shown in FIG. 12, a camera 12 and a robotic arm 10 of a robotic arm system 1 are arranged in a non-coaxial arrangement. Because of the non-coaxial arrangement, there is an offset d1 between a capturing optical axis 141 of the camera 12 and a flange axis 140 of the robotic arm 10. The above offset d1 causes random errors between a visual space and a mechanical space.

An end effector 11 is arranged on an end of the robotic arm 10. When the robotic arm 10 moves the end effector 11 (e.g., the robotic arm 10 changes its posture), a visual field of the camera 12 amount on the robotic arm 10 will be changed, such that the camera 12 may capture a target 13 with respect to different perspective.

As shown in FIG. 13, when the robotic arm 10 uses a flange axis 140 as the axis 18 to perform a rotational movement for an angle α1, the robotic arm 10 may process the target 13 actually because the end effector 11 doesn't move in the horizontal direction.

However, the visual field 16 of the camera 12 is moved to the visual field 17 after the rotation movement, such that the robotic arm system 1 is unable to position the target 13 in the visual space because a target image 15 of the target 13 is out of the visual field 17.

To solve the above problem caused by the non-coaxial arrangement, the present disclosure provides an automatic robotic arm system and a coordinating method of robotic arm and computer vision thereof, which makes an incident end of the capturing optical axis to overlap the flange axis through a novel optical path structure (especially, a beam-splitting mirror) for achieving an effect of coaxial hand and eye.

Moreover, the present disclosure may eliminate the offset generated by the non-coaxial arrangement and prevent the target from being out of the visual field because of the achievement of the effect of coaxial hand and eye.

Moreover, the present disclosure may significantly increase an operable space of the robotic arm and an upper limit of the camera's allowable volume because of the non-coaxial arrangement.

Moreover, the present disclosure may assist in a position calibration between the visual space and the mechanical space to improve the coordination between the robotic arm and the computer vision through the optical ranging.

Figure 1:
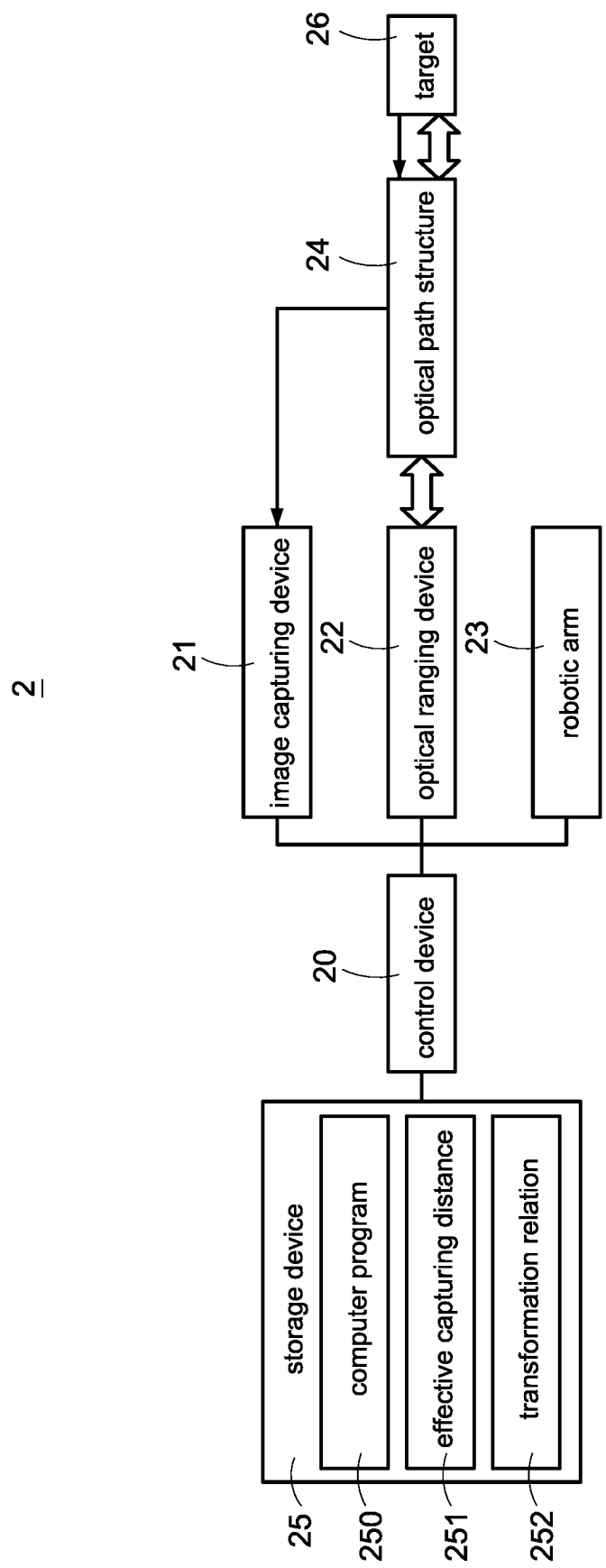
FIG. 1 is an architecture diagram of an automatic robotic arm system of one embodiment of the present disclosure.

Please refer to FIG. 1, FIG. 1 is an architecture diagram of an automatic robotic arm system of one embodiment of the present disclosure. An automatic robotic arm system 2 of the present disclosure mainly includes an image capturing device 21, an optical ranging device 22, a robotic arm 23, a storage device 25, and a control device 20 connected to the above devices.

The image capturing device 21, e.g., RGB camera or other types of color cameras, is used to capture a target 26 in an operation zone to obtain a color image (e.g., a calibration image and an operation image described later) including an image of the target 26. The above color image is mainly used for an analysis of computer vision to provide a calculation result as a motion reference to the robotic arm 23.

The robotic arm 23 is used to move a device mounted thereon in a 3D space to perform measurement (when the optical ranging device 22 is mounted), capturing (when the image capturing device 21 is mounted), process (when an operating device is mounted), or other operations.

A visual flange axis is set corresponding to the end of the robotic arm 23 to be a motion reference of the robotic arm 23, and a space position of the end of the robotic arm 23 may be calculated based on the flange axis. The above calculation related to the flange axis is omitted here for brevity.

In the present disclosure, the image capturing device 21 is arranged outside the flange axis of the robotic arm 23 both for increasing the operable space of the robotic arm 23 and for increasing the upper limit of the allowable volume of the image capturing device 21. The above operable space is determined based on a movable range of the flange axis. Namely, the present disclosure may use a camera having a larger size and a stronger performance, and the camera may have less restriction on wiring.

In one of the embodiments, when an operating device (such as the operating device 54 shown in FIG. 8 and FIG. 9) is mounted on the end of the robotic arm 23, the operating device 54 may perform processing at the different positions through the motion of the robotic arm 23. The present disclosure may implement different applications through mounting different types of the operating devices 54.

In one of the embodiments, the operating device 54 may be connected to the control device 20 and controlled by the control device 20 to perform an automatic action.

For example, when the operating device 54 includes a grabbing end effector, a soldering heater, a marking tool, a grinding tool, an assembling end effector, a gluing tool, and/or a fixing tool, the above automatic action may include the corresponding actions, e.g., a gripping action (such as gripping or picking up an electronic component), a soldering action (such as controlling a laser soldering heater to heat), a marking action (such as marking by branding or spraying, etc.), a grinding action (such as cutting or grinding, etc.), an assembling action (such as performing stitching or stacking, etc. on multiple targets according to a specified assembly method), a gluing action (such as gluing or adhesive dispensing, etc.) and/or a fixing action (such as locking the screws or nuts).

The optical ranging device 22, e.g., an infrared rangefinder, is used to measure a target distance between the optical ranging device 22 and the target 26 through an optical manner.

In one of the embodiments, the above measurement is implemented by making the target 26 to be in a virtual ranking axis and measuring the target distance toward a direction parallel to the ranging axis through triangulation.

In one of the embodiments, the optical ranging device 22 is arranged on the end of the robotic arm 23 or a position close to the end, such that the optical ranging device 22 may measure a distance between the end and the target 26.

In one of the embodiments, a ranking axis of the optical ranging device 22 is parallel to or overlaps the flange axis of the robotic arm 23, such that the measured target distance corresponds to a depth value calculated from the end of the robotic arm 23 in the flange axis to the target 26 directly below thereof.

The optical path structure 24 is arranged on the end of the robotic arm 23 or a position close to the end. The optical path structure 24 is used to receive an incident light emitted or reflected from the target 26, split the incident light into a visible light and a ranging light, and guide the visible light and the ranging light respectively to the image capturing device 21 and to the optical ranging device 22.

Figure 7:
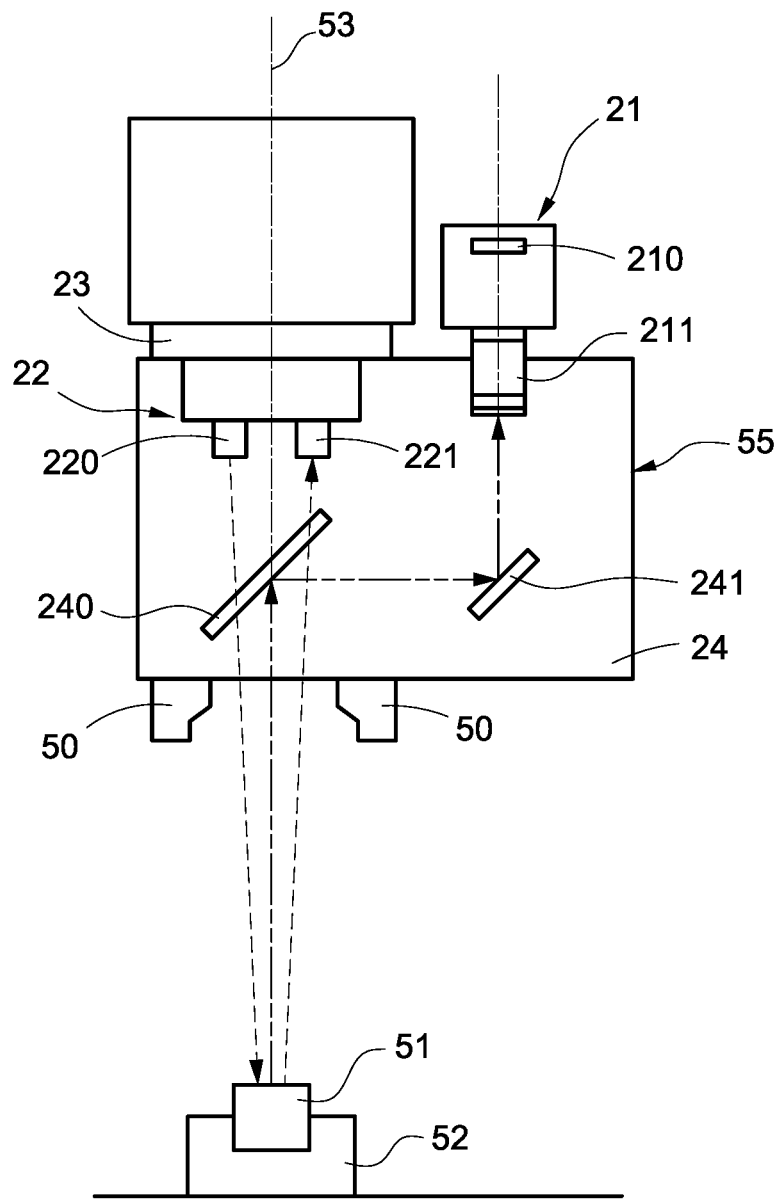
FIG. 7 is a setup schematic view of an automatic robotic arm system of one embodiment of the present disclosure.
Figure 8:
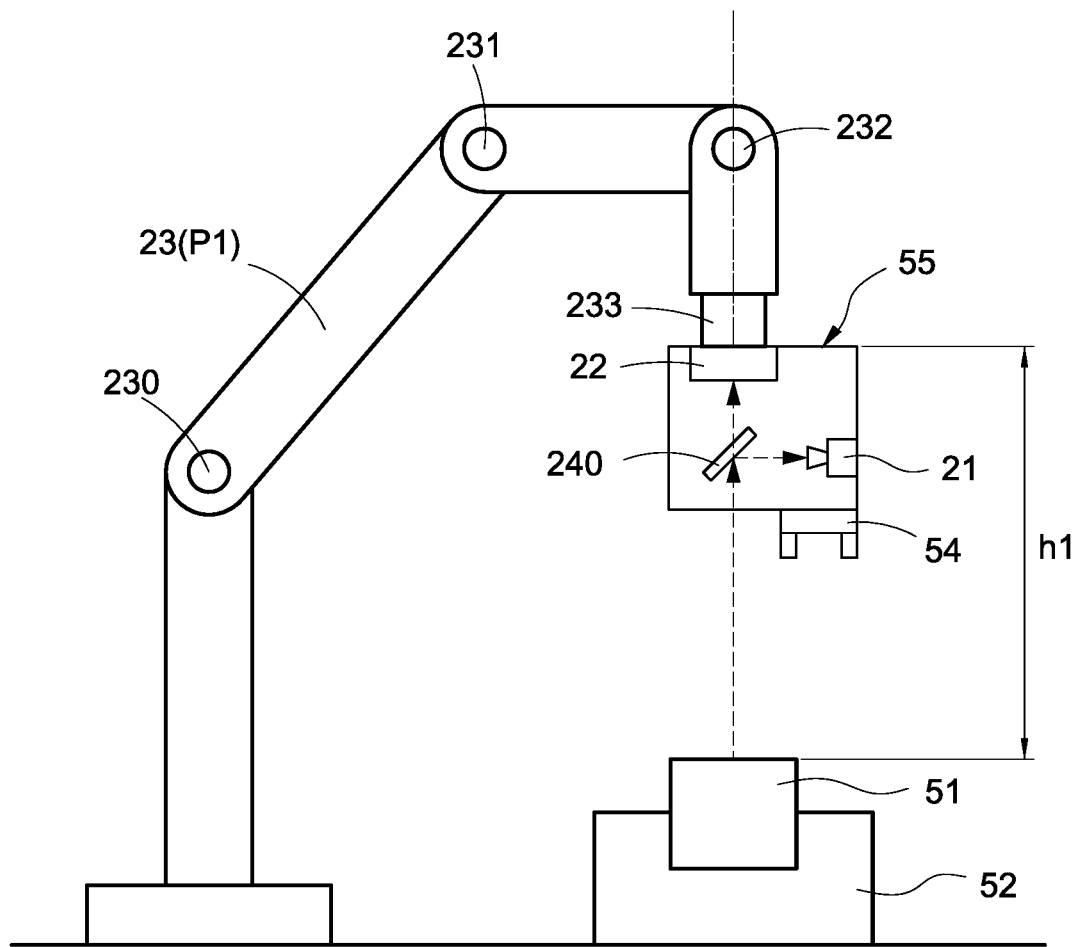
FIG. 8 is a first schematic view of a calibration mode of one embodiment of the present disclosure.
Figure 9:
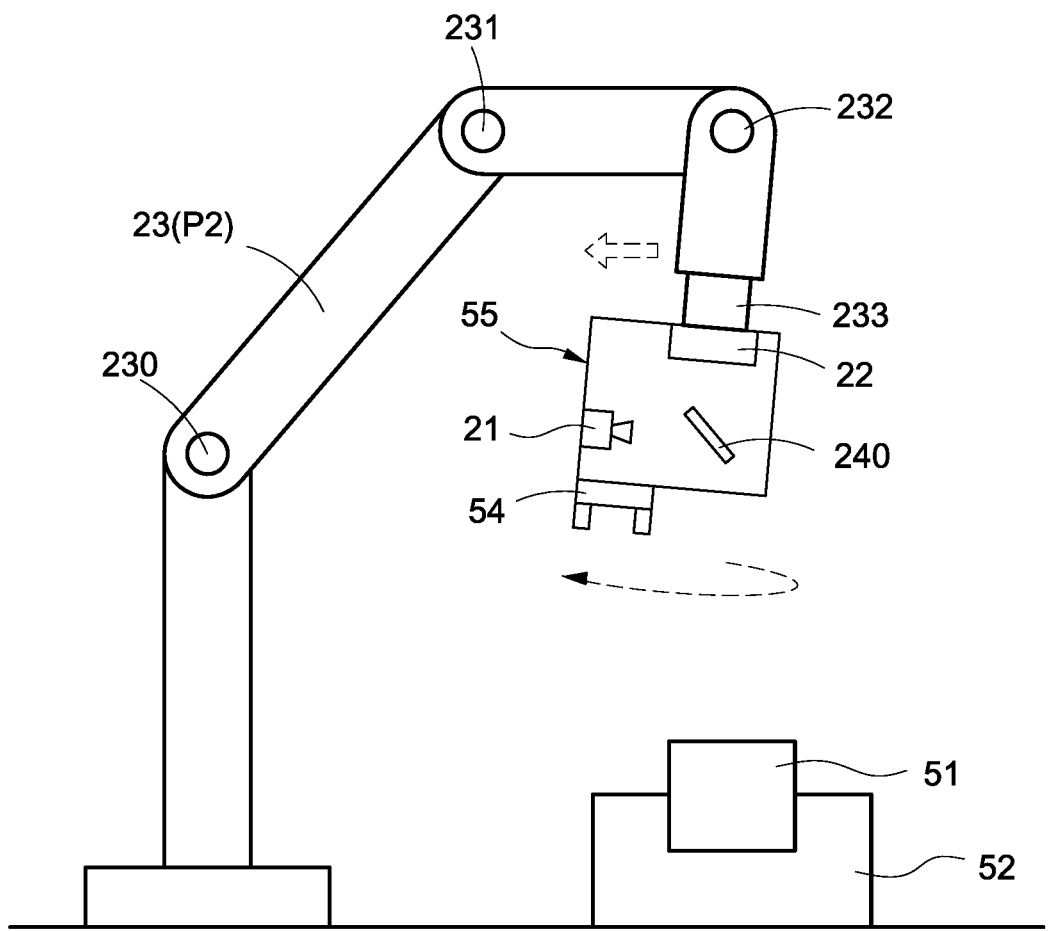
FIG. 9 is a second schematic view of a calibration mode of one embodiment of the present disclosure.

More specific, the optical path structure 24 includes a beam-splitting mirror 240 as shown in FIGS. 7-9. The beam-splitting mirror 240 may be an optical prism glass. The beam-splitting mirror 240 may split the incident light into different wavelengths of light, e.g., splitting the incident light into the visible light and the infrared light (the ranging light). A principle used by the optical path structure 240 is that the different wavelengths of light have different refractive indices. After splitting, the above visible light is guided to a lens 211 and an image sensor 210 (as shown in FIG. 7) of the image capturing device 21 through a visible optical path. The visible light may be projected on the image capturing device 21 directly or through a reflector and/or lens. The above ranging light is guided to an optical receiver 221 (as shown in FIG. 7) of the image capturing device 22 through a ranging optical path. The ranging light may be projected on the optical ranging device 22 directly or through a reflector and/or lens. Thus, the optical path structure 24 may achieve the coaxial arrangement of the flange axis, the ranging axis, and a capturing optical axis (e.g., a center point of view field or other reference point) at the incident end, and allow the image capturing device 21 to be arranged outside the flange axis (and outside the ranging axis).

The storage device 25, e.g., a hard disk drive, a solid-state drive, a ROM, a RAM, an EEPROM, a flash memory, or any combination of multiple storage media, is used to store data. For example, the storage device 25 may store an effective capturing distance 251 and a transformation relation 252.

The control device 20 is used to control the automatic robotic arm system 2, e.g., to trigger a calibration mode and an operation mode.

Figure 2:
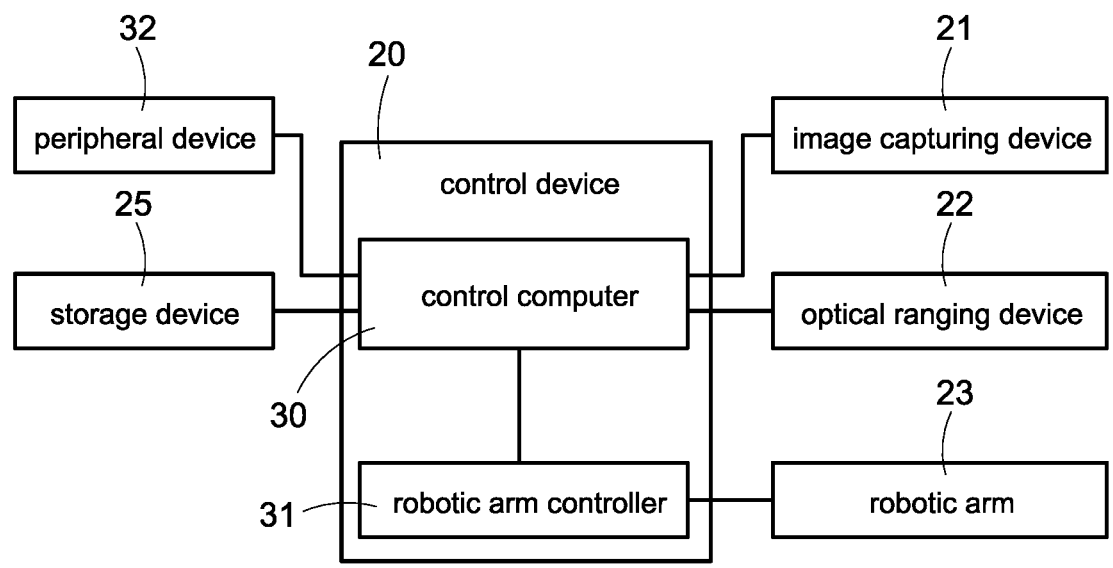
FIG. 2 is a partial architecture diagram of an automatic robotic arm system of one embodiment of the present disclosure.

Please refer to FIG. 2, FIG. 2 is a partial architecture diagram of an automatic robotic arm system of one embodiment of the present disclosure. In this embodiment, the control device 20 may include a control computer 30 and a robotic arm controller 31.

The robotic arm controller 31 is connected to the robotic arm 23 and used to control the robotic arm 23 to move based on a received arm control command.

In one of the embodiments, the robotic arm 23 includes a plurality of joints 230-233 (as shown in FIG. 8 and FIG. 9) for providing multiple degrees of freedom. Each of the joints 230-233 may be controlled by a servo motor to adjust a rotating angle. Thus, the robotic arm 23 may move with the multiple degrees of freedom.

The arm control command may instruct a destination (e.g., a machine space coordinate) of motion of the robotic arm 23. The robotic arm controller 31 may transform the arm control command into a corresponding posture coordinate (e.g., a rotating angle of each of the joints 230-233), and control each of the joints 230-233 to rotate for the robotic arm 23 to pose a posture corresponding to the arm control command.

The control computer 30, e.g., an industrial computer or a personal computer, is connected to the robotic arm controller 31, the image capturing device 21, the optical ranging device 22, and the storage device 25, and used to control these devices 21, 22, and 25. The control computer 30 may be connected to these devices 21, 22, and 25 through an industrial network or other local area networks (LANs). For example, the control computer 30 may send the above arm control command to the robotic arm controller 31 to control the robotic arm 23.

In one of the embodiments, the control computer 30 is further connected to a peripheral device 32. The peripheral device 32 may be a communication interface for connecting to a network, a human-machine interface for interacting with users, and/or a power supply apparatus for providing electricity, etc.

Please refer to FIG. 7, FIG. 7 is a setup schematic view of an automatic robotic arm system of one embodiment of the present disclosure.

As shown in FIG. 7, the automatic robotic arm system 2 may include an installation base 55. The installation base 55 is connected to the end of the robotic arm 23 and moved with the robotic arm 23 in the 3D space.

Moreover, the image capturing device 21, the optical ranging device 22 and the optical path structure 24 are arranged on the installation base 55.

In one of the embodiments, one or more light sources 50 (e.g., a ring light) may be arranged on the installation base 55. The light source 50 is used to illuminate the operation zone (especially, a target 51 and a fixture 52 in the operation zone), such that the image capturing device 21 may obtain the target image with better brightness. The light source 50 may significantly reduce the effect of caused on the target image by the environmental brightness variation.

In one of the embodiments, the optical path structure 24 may include a beam-splitting mirror 240 and a reflector 241. The reflector 241 is used to reflect the visible light split by the beam-splitting mirror 240 to the lens 211 and the image sensor 210 of the image capturing device 21. The capturing optical axis of the image capturing device 21 may overlap the flange axis 53 of the robotic arm 23 through the beam-splitting mirror 240 and the reflector 241. Moreover, the ranging axis of the optical ranging device 22 may be parallel to or overlap the flange axis 53.

In one of the embodiments, the beam-splitting mirror 240 may be a longpass dichroic mirror and have a visible light reflectivity above 80% and an infrared transmittance above 75%. For example, the beam-splitting mirror 240 may have the visible light reflectivity of 97% and the infrared transmittance of 92%. In another example, the beam-splitting mirror 240 may be penetrated by a light having a wavelength above 730 nm (e.g., 750 nm) and reflect a light having a wavelength in a range of 300 nm-730 nm (e.g., 450 nm-490 nm).

In one of the embodiments, the optical ranging device 22 may include an optical emitter 220, an optical receiver 221 and a ranging controller (not shown in the figures) connected to the above devices 220, 221. A vertical line at a midpoint of the optical emitter 220 and the optical receiver 221 is the ranging axis. In FIG. 7, the ranging axis overlaps the flange axis 53.

The optical emitter 220 is used to emit the ranging light (ranging infrared light) toward the target 51. After hitting the target 51, the ranging light will be reflected to the beam-splitting mirror 240. The reflected ranging light penetrates the beam-splitting mirror 240, and arrives the optical receiver 221. The ranging controller, e.g., a microcontroller or a SoC, is configured to calculate the target distance (i.e., the depth value of the target 51), through triangulation, based on a transmit-receive time difference of the ranging light, a light propagation speed, and a distance between the optical emitter 220 and the optical receiver 221.

Figure 3:
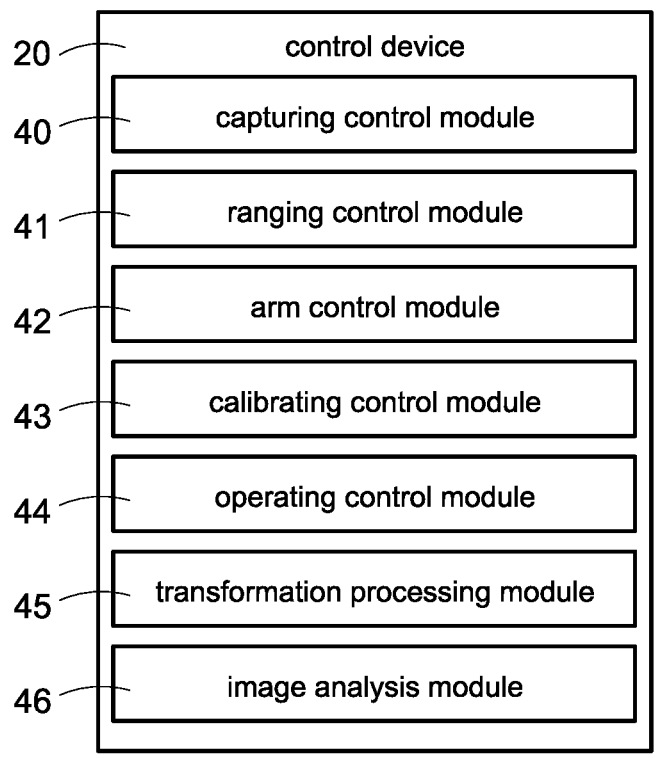
FIG. 3 is an architecture diagram of a control device of one embodiment of the present disclosure.

Please refer to FIG. 3, FIG. 3 is an architecture diagram of a control device of one embodiment of the present disclosure. The control device 20 may include a capturing control module 40, a ranging control module 41, an arm control module 42, a calibrating control module 43, an operating control module 44, a transformation processing module 45, and an image analysis module 46. The modules 40-46 are configured to respectively implement different functions of the present disclosure.

The capturing control module 40 is used to control the image capturing device 21, e.g., controlling a capturing action, controlling a focusing action, acquiring an image data, and/or executing a configured image process, etc.

The ranging control module 41 is used to control the optical ranging device 22, e.g., controlling a measurement, acquiring a measurement data (target distance), and/or executing a measurement calibration, etc.

The arm control module 42 is used to control the posture of the robotic arm 23 by sending the arm control command to the robotic arm controller 31, and the arm control module 42 may acquire a current position of the robotic arm 23.

The calibrating control module 43 is used to execute the calibration mode.

The operating control module 44 is used to execute the operation mode.

The transformation processing module 45 is used to compute a coordinates transformation from the visual space to the mechanical space and a coordinates transformation from the mechanical space to the visual space.

The image analysis module 46 is used to execute an image analysis and an image process on the target image.

The above-mentioned modules 40-46 are connected to each other (such as by electrical connections or information links), and any one of the modules 40-46 may be a hardware module (such as an electronic circuit module, an integrated circuit module, or an SoC, etc.), a software module (such as firmware, an operating system, or an application program), or a combination of the hardware module and the software module. This example is not intended to limit the scope of the present disclosure.

Please be noted that when one of the above-mentioned modules 40-46 is the software module such as firmware, an application program, or an operating system, the storage device 25 may include a non-transitory computer-readable media (not shown in figures). The non-transitory computer-readable media stores a computer program 250 as shown in FIG. 1. The computer program 250 records computer-readable codes. When the control device 20 executes the above computer-readable codes, the functions of the software module (which is one of the modules 40-46) may be achieved correspondingly.

In one of the embodiments, at least one of the above-mentioned modules 40-46 may be installed in the control computer 30. For example, the storage device 25 may include a storage in the control computer 30. The above storage stores the above computer program 250. A processor of the control computer 30 may execute the computer program 250 to achieve the functions of the at least one of the modules 40-46 correspondingly.

Figure 4:
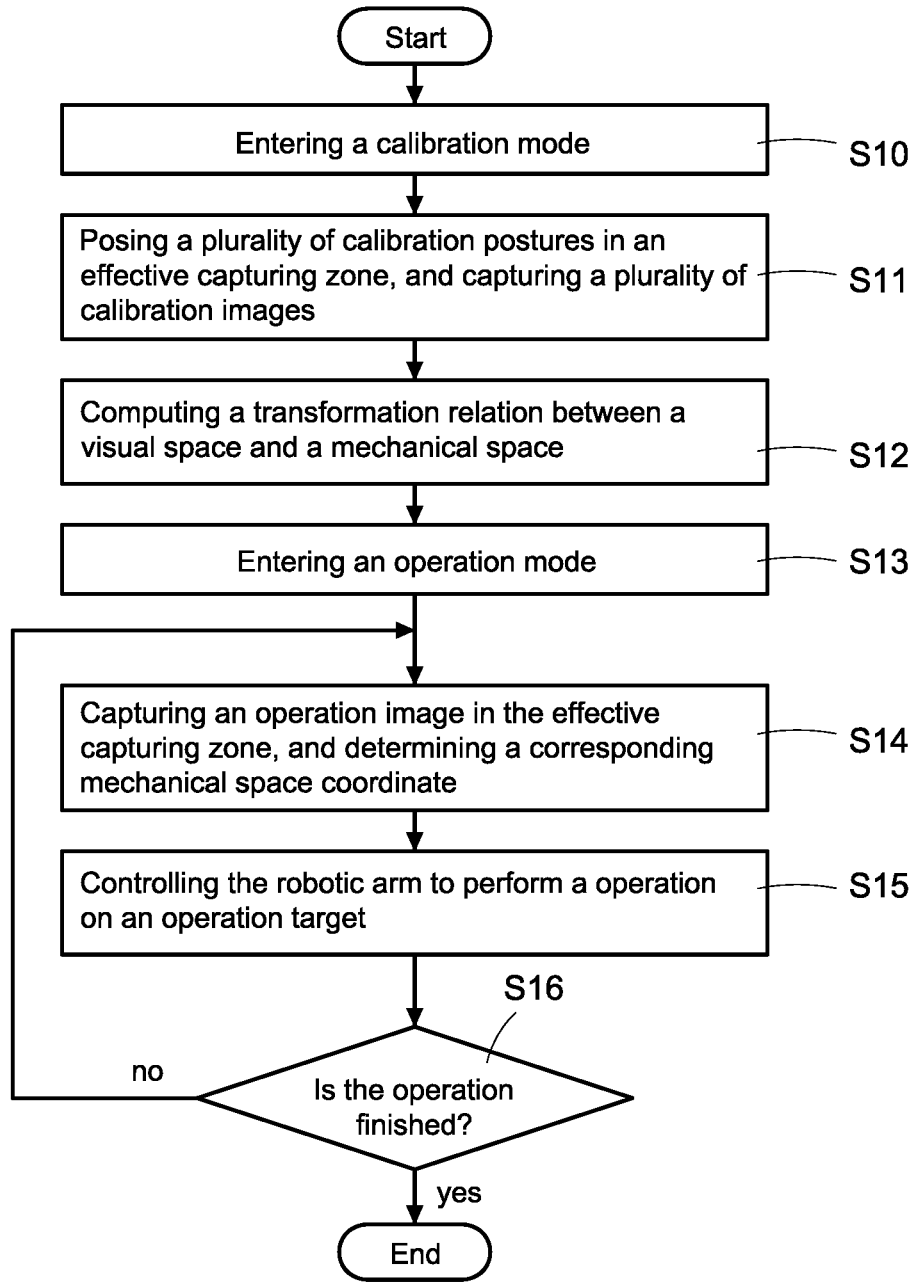
FIG. 4 is a flowchart of a coordination method of one embodiment of the present disclosure.

Please refer to FIG. 4, FIG. 4 is a flowchart of a coordination method of one embodiment of the present disclosure. The coordinating method of robotic arm and computer vision of this embodiment includes calibration steps S10-S12 and operation steps S13-S16.

In step S10, the control computer 30 enters the calibration mode through the calibrating control module 43 for executing coordination and calibration between the mechanical space and the visual space.

For example, the control computer 30 may enter the calibration mode when accepting a start calibration operation or receiving a calibration command from the user.

In step S11, the control computer 30 controls the robotic arm 23 to move, acquires a current target distance, and determines based on the current target distance whether (the end of) the robotic arm 23 enters an effective capturing zone of the image capturing device 21.

When the robotic arm 23 is in the effective capturing zone, the control computer 30 may control the robotic arm 23 to pose a plurality of calibration postures in the effective capturing zone, and capture at least one calibration image for each of the calibration postures. Thus, multiple calibration images respectively corresponding to the calibration postures are acquired.

In step S12, the control computer 30 computes a transformation relation between the visual space of the image capturing device 21 and the mechanical space of the robotic arm 23 through the transformation processing module 45 base on the calibration postures and the calibration images.

In one of the embodiments, the control computer 30 may recognize a visual space coordinate of a calibration target in each calibration image, compute a variation of multiple visual space coordinates of the calibration target in multiple calibration images, compute a variation of multiple mechanical space coordinates respectively corresponding to different calibration postures, and compute the transformation relation between the visual space and the mechanical space based on the variation of the visual space coordinates and the variation of the mechanical space coordinates.

In one of the embodiments, a mathematical relationship among the visual space $$\begin{bmatrix} x_r \\ y_r \\ z_r \end{bmatrix},$$

the mechanical space $$\begin{bmatrix} x_c \\ y_c \\ z_c \end{bmatrix},$$

and the transformation relation $T_r^c$ is:

$$\begin{bmatrix} x_c \\ y_c \\ z_c \end{bmatrix} = T_r^c \begin{bmatrix} x_r \\ y_r \\ z_r \end{bmatrix}.$$

In one of the embodiments, the transformation relation $T_r^c$ may be calculated through the following steps.

The image capturing device 21 captures a feature f (e.g., a checkerboard) of the calibration target many times to acquire a relation equation $T_{c_{i=1-N}}^{f}$ of the image capturing device 21 and the feature f in different calibration postures. A plurality of expression equations $T_{w_{i=1-N}}^{r}$ of the calibration postures may be obtained at the same time, wherein W indicates a machine space coordinate (e.g., a world coordinate). Because the machine space coordinate of the calibration target (feature) is fixed (which is $T_w^f$), a relation equation may be expressed: $T_w^f = T_{w_i}^r T_r^c T_{c_i}^f$, i=1~N.

Because $T_{w_i}^r$, and $T_{c_i}^f$, i=1~N are known, the present disclosure may acquire a plurality of data to optimize the above equation to obtain the best solution $T_r^c$ with the smallest error term. Namely, when there is more correction data, there is a more accurate conversion relationship $T_r^c$.

In step S13, the control computer 30 enters the operation mode through the operating control module 44 for performing operation.

For example, the control computer 30 may enter the operation mode when accepting a start operating operation or receiving an operation command from the user.

In step S14, the control computer 30 controls the robotic arm 23 to move, acquires the current target distance, and determines based on the current target distance whether (the end of) the robotic arm 23 is in the effective capturing zone of the image capturing device 21.

When the robotic arm 23 is in the effective capturing zone, the control computer 30 may control the image capturing device 21 to capture the operation target to obtain the operation image, execute an operation-related image analysis process on the operation image through the image analysis module 46, and determine a position (a visual space coordinate) for operation in the operation image. Then, the control computer 30 uses the transformation relation to transform the visual space coordinate into the machine space coordinate through the transformation processing module 45. Moreover, the control computer 30 controls the robotic arm 23 to move to the machine space coordinate.

In step S15, the control computer 30 controls the robotic arm 23 to perform the operation on the operation target.

In one of the embodiments, the control computer 30 may further control the operating device 54 to perform the automatic action at the machine space coordinates, e.g., a gripping action, a soldering action, a marking action, a grinding action, an assembling action, a gluing action, and/or a fixing action.

In step S16, the control computer 30 determines whether the operation is finished. The control computer 30 finishes the coordination method when the operation is finished, or performs the step S14 when the operation is not finished.

The present disclosure may calibrate the coordination between the robotic arm and the computer vision, and improve the hand-eye coordination of the robot.

Figure 5:
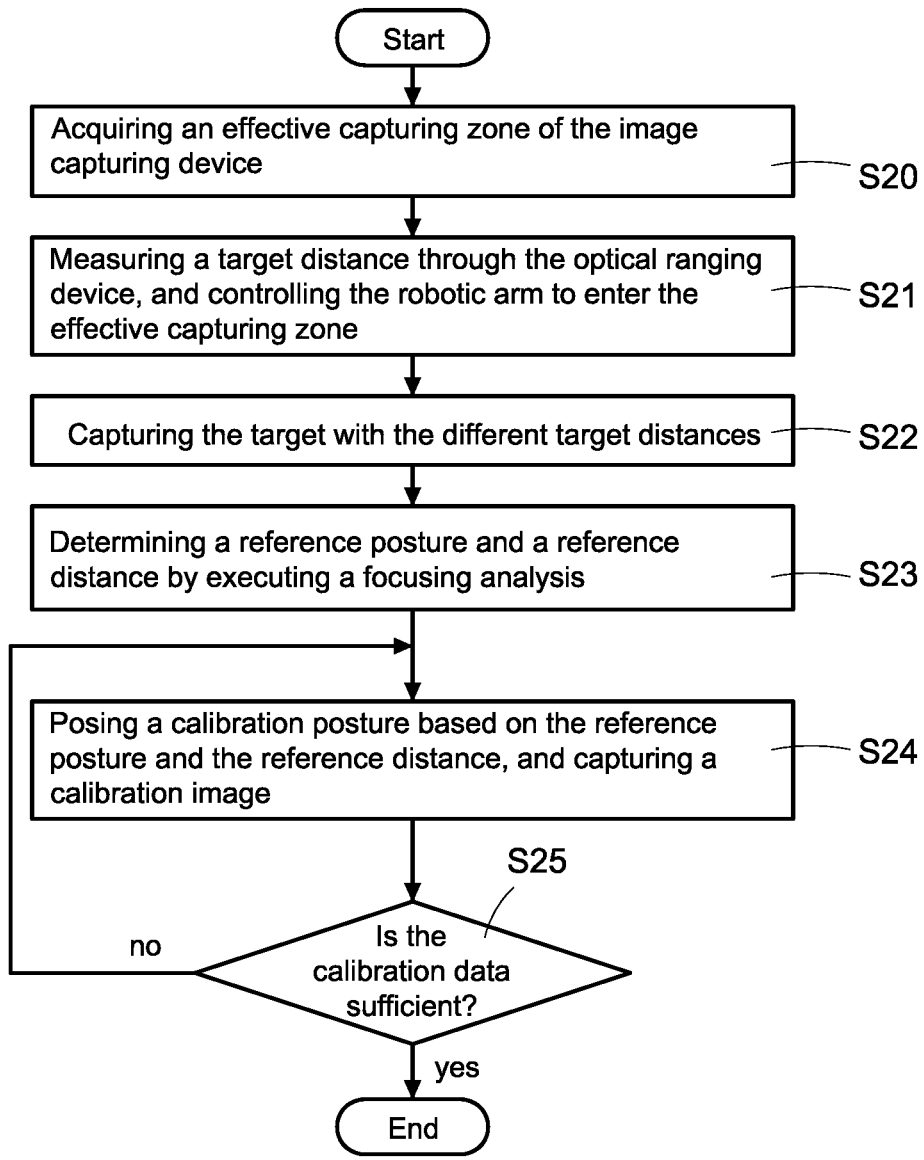
FIG. 5 is a partial flowchart of a coordination method of one embodiment of the present disclosure.

Please refer to FIG. 4 and FIG. 5, wherein FIG. 5 is a partial flowchart of a coordination method of one embodiment of the present disclosure. In comparison with the coordinating method shown in FIG. 4, FIG. 5 includes steps S20-S25 to implement the step S11 of FIG. 4.

In step S20, the control computer 30 acquires an effective capturing distance of the image capturing device 21 (e.g., the effective capturing distance 251 shown in FIG. 1), and configures the effective capturing zone base on the effective capturing distance.

The above-mentioned effective capturing distance may be a maximum/minimum focusing distance of the image capturing device 21, and the above-mentioned effective capturing zone may be a focusable zone of the image capturing device 21.

In one of the embodiments, when the effective capturing distance is 50 centimeters, the control computer 30 may configure the effective capturing zone of 0-50 centimeters, 25-50 centimeters, or 25-75 centimeters, but this specific example is not intended to limit the scope of the present disclosure.

Besides, when a distance between the image capturing device 21 and a capture target is matched with the above effective capturing distance or the above effective capturing zone, the image capturing device 21 may correctly focus on the capture target and acquire the focused target image. When the distance between the image capturing device 21 and the capture target is neither matched with the above effective capturing distance nor the above effective capturing zone, the image capturing device 21 acquires a fuzzy target image because the image capturing device 11 is unable to correctly focus on the capture target.

In step S21, the control computer 30 controls the robotic arm 23 to move and continuously measures the target distance until the control computer 30 determines based on the target distance that the robotic arm 23 enters the effective capturing zone.

In step S22, the control computer 30 continuously measures the current target distance, controls the robotic arm 23 to move in the effective capturing zone and pose a plurality of different focus-testing postures, and controls the image capturing device 21 to capture a focus-testing image for each of the focus-testing postures.

In one of the embodiments, the above-mentioned focus-testing postures are posed with different target distances. Namely, the control computer 30 keeps changing a height of the robotic arm 23 in the effective capturing zone (e.g., the robotic arm 23 may approach the target gradually from a position far away) and acquires the focus-testing images with different heights.

In step S23, the control computer 30 executes a focusing analysis on the focus-testing images and the corresponding target distances to determine a reference posture and a reference distance through the image analysis module 46.

In one of the embodiments, the above-mentioned focusing analysis includes: selecting at least one focused image (i.e., a sharp image) from the focus-testing images; determining the reference posture (e.g., a center or a center of gravity of the focus-testing postures) based on the focus-testing posture(s) used to capture the at least one focused image; and determining the reference distance (e.g., an average value) based on the target distance(s) used to capture the at least one focused image.

In one of the embodiments, the above-mentioned focusing analysis may be executed to determine a clearest focus-testing image by analyzing edge features or gradients, etc. of the focus-testing images, and acquire the focus-testing posture and the target distance used to capture the clearest focus-testing image as the reference posture and the reference distance.

In step S24, the control computer 30 controls the robotic arm 23 to pose the calibration posture based on the reference posture and the reference distance, and captures the corresponding calibration image for the calibration posture.

In one of the embodiments, the target distance of each calibration posture is equal to or close to the reference distance. The target distances are changed based on the reference posture, e.g., rotating or moving the end of the robotic arm 23 in a plane having the same height.

In step S25, the control computer 30 determines whether a default stop collecting condition is met through the calibrating control module 43 for determining whether the collected calibration data is sufficient. For example, the control computer 30 determines whether the collected calibration data meets the default number, e.g., 10, 50, or 100, etc., but this specific example is not intended to limit the scope of the present disclosure.

When the stop collecting condition is met, the control computer 30 stops collecting the calibration data. Otherwise, the control computer 30 performs step S24 to acquire another calibration image captured when posing another calibration posture.

Thus, the present disclosure may continuously change a rotation and a displacement of the robotic arm for the robotic arm to pose different calibration postures, and capture the calibration image for each of the calibration postures until the collected calibration data is sufficient.

In one of the embodiments, at least two of the collected calibration postures have a plane that is parallel to the fixture 52.

In one of the embodiments, at least two of the collected calibration postures are corresponded to different target distances, i.e., different heights.

The transformation relation computed by the present disclosure may be more accurate due to the overlapping of the capturing optical axis and the flange axis.

Figure 6:
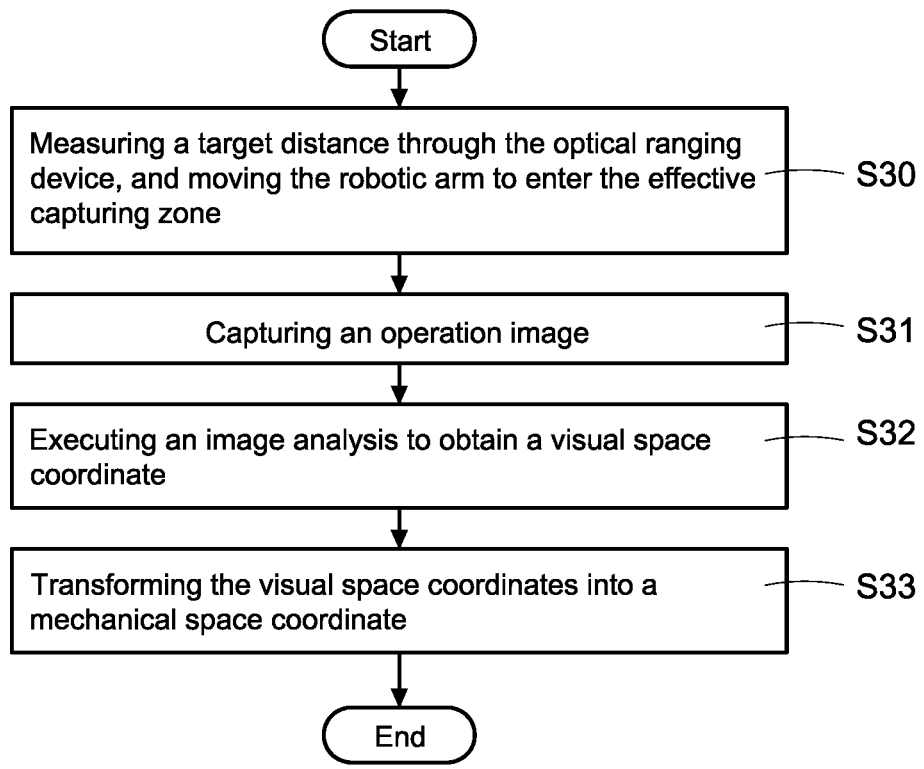
FIG. 6 is a partial flowchart of a coordination method of one embodiment of the present disclosure.

Please refer to FIG. 4 and FIG. 6, wherein FIG. 6 is a partial flowchart of a coordination method of one embodiment of the present disclosure. In comparison with the coordination method shown in FIG. 4, FIG. 6 includes steps S30-S33 to implement the step S14 of FIG. 4.

In step S30, the control computer 30 controls the robotic arm 23 to move, continuously acquires the target distance, and determines based on the target distance whether the robotic arm 23 enters the effective capturing zone, e.g., determining whether the target distance is less than the effective capturing distance 251.

In step S31, the control computer 30 captures the operation target to acquire the operation image when the robotic arm 23 (mounted with the image capturing device 21) enters the effective capturing zone.

In step S32, the control computer 30 executes an image analysis on the operation image through the image analysis module 46.

In one of the embodiments, the above image analysis may include: recognizing the operation target in the operation image, and executing an operation analysis at a position of the operation target in the visual space to determine the visual space coordinate for performing operation.

In one of the embodiments, the above image analysis may include: a defect-detecting process (e.g., detecting component defects), a measuring process (e.g., measuring an area or a length of each component), a classifying/filtering process (e.g., recognizing and classifying components), or a component-positioning process (e.g., determining a grabbing point, an assembling point, or a soldering point, etc. of each component).

In step S33, the control computer 30 transforms the visual space coordinate for performing operation into the mechanical space coordinate for performing operation based on the transformation relation 252.

In one of the embodiments, the control computer 30 may compensate for the machine space coordinate based on a position error of the operating device 54 and the flange axis to obtain a compensated mechanical space coordinate. Moreover, the control computer 30 may generate an arm control command based on the compensated mechanical space coordinate, and send the arm control command to the robotic arm controller 31 to control the robotic arm 23 to move the operating device 54 to the mechanical space coordinate for performing operation.

Thus, the present disclosure may execute a process through the computer vision automatically.

Figure 10:
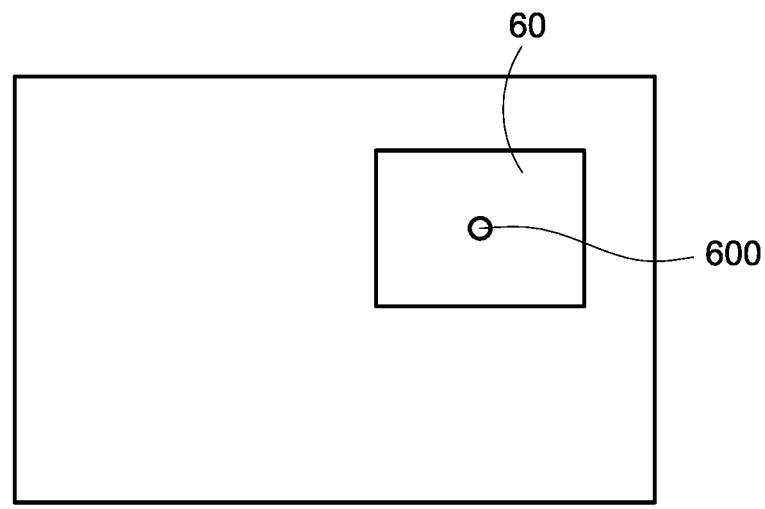
FIG. 10 is a schematic view of a first calibration image of one embodiment of the present disclosure.
Figure 11:
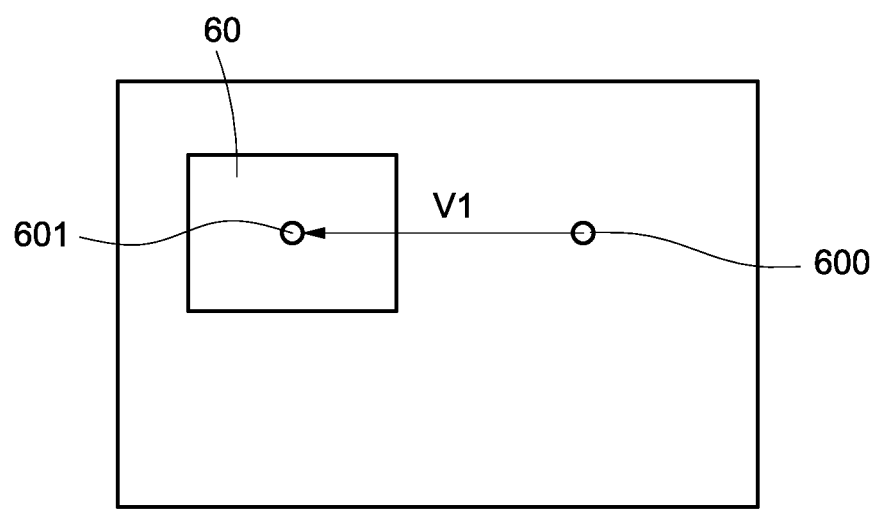
FIG. 11 is a schematic view of a second calibration image of one embodiment of the present disclosure.

Please refer to FIGS. 8-11, wherein FIG. 8 is a first schematic view of a calibration mode of one embodiment of the present disclosure, FIG. 9 is a second schematic view of a calibration mode of one embodiment of the present disclosure, FIG. 10 is a schematic view of a first calibration image of one embodiment of the present disclosure, and FIG. 11 is a schematic view of a second calibration image of one embodiment of the present disclosure.

In this embodiment, the optical path structure only includes the beam-splitting mirror 240. The visible light split by the beam-splitting mirror 240 is guided to the image capturing device 21. An orientation of the lens of the image capturing device 21 is perpendicular to the flange axis.

Moreover, the operating device 54 is arranged on a bottom of the installation base 55, and is out of the flange axis, so as to prevent the incident light from being interfered.

Moreover, in the above arrangement, a distance between the operating device 54 and the flange axis is fixed, such that the control device 20 may calculate the current spatial position of the operating device 54 based on the flange axis quickly and accurately.

When the end of the robotic arm 23 moves to the effective capturing distance h1, the control device 20 may adjust the joints 230-233 to make the robotic arm 23 posing a first calibration posture as shown in FIG. 8, and capture a first calibration image as shown in FIG. 10 through the image capturing device 21.

Then, the control device 20 may adjust the joints 230 and 232 to make the robotic arm 23 posing a second calibration posture different from the first calibration posture as shown in FIG. 9, and capture a second calibration image as shown in FIG. 11 through the image capturing device 21.

As shown in FIG. 10, when the robotic arm 23 poses the first calibration posture, a feature (e.g., a center point) of the target 60 in the first calibration image is located at a position 600 of the visual space.

As shown in FIG. 11, when the robotic arm 23 changes to the second calibration posture, the feature of the target 60 in the second calibration image is moved to a position 601 of the visual space.

Then, the control device 20 may compute a variation of the mechanical space coordinates of the first calibration posture and the second calibration posture, compute a variation V1 of the visual space coordinates between the position 600 and the position 601, and relate the variation of the mechanical space coordinates with the variation V1 of the mechanical space coordinates to obtain the transformation relation between the mechanical space and the visual space. Thus, the calibration may be achieved.

While this disclosure has been described by means of specific embodiments, numerous modifications and variations could be made thereto by those skilled in the art without departing from the scope and spirit of this disclosure set forth in the claims.

What is claimed is:

1. A coordinating method for a robotic arm and a computer vision, the coordinating method comprising:
 a) in a calibration mode, controlling the robotic arm to pose a plurality of calibration postures in an effective capturing zone of an image capturing device based on a target distance measured by an optical ranging device, and capturing a plurality of calibration images through the image capturing device for the calibration postures, wherein a beam-splitting mirror is configured to guide a visible light to the image capturing device arranged outside a flange axis of the robotic arm, and guide a ranging light to the optical ranging device, and a ranging axis of the optical ranging device is parallel or overlapped with the flange axis;

b) computing a transformation relation between a visual space of the image capturing device and a mechanical space of the robotic arm based on the calibration postures and the calibration images;

c) in an operation mode, capturing an operation image through the image capturing device, and determining a mechanical space coordinate for performing operation based on the operation image and the transformation relation; and d) controlling the robotic arm to move to the mechanical space coordinate.

2. The coordinating method according to claim 1, wherein the step a) comprises:

a1) acquiring an effective capturing distance of the image capturing device, and configuring the effective capturing zone based on the effective capturing distance;

a2) controlling the robotic arm to pose a plurality of focus-testing postures with different target distances in the effective capturing zone, and capturing a plurality of focus-testing images for the focus-testing postures; and a3) executing a focused analysis on the focus-testing images and the target distances to determine a reference posture and a reference distance.

3. The coordinating method according to claim 2, wherein the focused analysis comprises:

e1) selecting at least one focused image from the focus-testing images; and e2) determining the reference posture and the reference distance based on one of the target distances and one of the focus-testing postures used to capture the at least one focused image.

4. The coordinating method according to claim 1, wherein the step a) comprises: a4) continuously controlling the robotic arm to pose different calibration postures based on a reference posture and a reference distance, and capturing the calibration images for the calibration postures until a stop collecting condition is met.

5. The coordinating method according to claim 1, wherein the step b) comprises:

b1) recognizing a calibration target and obtaining a visual space coordinate of the calibration target in each of the calibration images;

b2) computing a variation of the visual space coordinates of the calibration target in the calibration images;

b3) computing a variation of the mechanical space coordinates; and b4) computing the transformation relation between the visual space and the mechanical space based on the variation of the visual space coordinates and the variation of the mechanical space coordinates.

6. The coordinating method according to claim 1, wherein the step c) comprises:

c1) capturing the operation image when the robotic arm enters the effective capturing zone;

c2) recognizing an operation target in the operation image, and executing an operation analysis based on a position of the operation target to determine a visual space coordinate for performing operation; and c3) transforming the visual space coordinate for performing operation into the mechanical space coordinate for performing operation based on the transformation relation.

7. The coordinating method according to claim 6, wherein the operation analysis comprises at least one of a defect-detecting process, a measuring process, a classifying/filtering process, and a component-positioning process.

8. The coordinating method according to claim 1, further comprising: f) controlling the robotic arm to perform an automatic action at the mechanical space coordinate.

9. The coordinating method according to claim 8, wherein the automatic action comprises at least one of a gripping action, a soldering action, a marking action, a grinding action, an assembling action, a gluing action, and a fixing action.

10. The coordinating method according to claim 1, wherein the beam-splitting mirror is configured to comprise a visible light reflectivity above 80% and an infrared transmittance above 75%.

11. An automatic robotic arm system, comprising:

a robotic arm, used to move in a 3D space;

an image capturing device, arranged outside of a flange axis of the robotic arm and used to capture images;

an optical ranging device, arranged on the robotic arm and used to measure a target distance, wherein a ranging axis of the optical ranging device is parallel to or overlaps the flange axis;

an optical path structure, comprising a beam-splitting mirror used to guide a visible light to the image capturing device and guide a ranging light to the optical ranging device; and a control device, connected to the robotic arm, the image capturing device, and the optical ranging device;

wherein the control device is configured in a calibration mode to control the robotic arm to pose a plurality of calibration postures in an effective capturing zone of the image capturing device based on the target distance, control the image capturing device to capture a plurality of calibration images for the calibration postures, compute a transformation relation between a visual space of the image capturing device and a mechanical space of the robotic arm based on the calibration postures and the calibration images;

wherein the control device is configured in an operation mode to control the image capturing device to capture an operation image, and determine a mechanical space coordinate for performing operation based on the operation image and the transformation relation, and control the robotic arm to move to the mechanical space coordinate.

12. The automatic robotic arm system according to claim 11, wherein the control device comprises:

a robotic arm controller, connected to the robotic arm and used to control the robotic arm to pose based on an arm control command; and a control computer, connected to the robotic arm controller, the image capturing device, and the optical ranging device, and used to send the arm control command;

wherein the control computer is configured to acquire an effective capturing distance of the image capturing device, configure the effective capturing zone based on the effective capturing distance, control the robotic arm to pose a plurality of focus-testing postures with different target distances in the effective capturing zone, and capture a plurality of focus-testing images for the focus-testing postures;

wherein the control computer is configured to execute a focused analysis on the focus-testing images and the target distances to determine a reference posture and a reference distance;

wherein the control computer is configured to continuously control the robotic arm to pose different calibration postures based on the reference posture and the reference distance, and capture the calibration images for the calibration postures until a stop collecting condition is met.

13. The automatic robotic arm system according to claim 12, wherein the control computer is configured to select at least one focused image from the focus-testing images, and determine the reference posture and the reference distance based on one of the target distances and one of the focus-testing postures used to capture the at least one focused image.

14. The automatic robotic arm system according to claim 11, further comprising an installation base, used to arrange the image capturing device, the optical ranging device, and the optical path structure;
wherein the robotic arm is connected to the installation base through an end, and used to move the installation base in the 3D space;
wherein the control device is configured to recognize a calibration target and obtain a visual space coordination of the calibration target in each of the calibration images, compute a variation of the visual space coordinates of the calibration target in the calibration images, compute a variation of the mechanical space coordinates, and compute the transformation relation between the visual space and the mechanical space based on the variation of the visual space coordinates and the variation of the mechanical space coordinates.

15. The automatic robotic arm system according to claim 11, wherein the robotic arm comprises a plurality of joints for moving with multiple degrees of freedom, the control device is configured to adjust a rotating angle of each joint to control the robotic arm to move with the multiple degrees of freedom based on the mechanical space coordinate;
wherein the control device is configured to capture the operation image when the robotic arm enters the effective capturing zone, recognize an operation target in the operation image, execute an operation analysis to determine a visual space coordinate for performing operation based on a position of the operation target, and transform the visual space coordinate for performing operation into the mechanical space coordinate for performing operation based on the transformation relation;
wherein the operation analysis comprises at least one of a defect-detecting process, a measuring process, a classifying/filtering process, and a component-positioning process.

16. The automatic robotic arm system according to claim 11, further comprising an operating device, connected to the control device;
wherein the control device is configured to control the operating device to perform an automatic action when the robotic arm moves to the mechanical space coordinate.

17. The automatic robotic arm system according to claim 16, wherein the operating device comprises at least one of a grabbing end effector, a soldering heater, a marking tool, a grinding tool, an assembling end effector, a gluing tool, and a fixing tool;
wherein the automatic action comprises at least one of a gripping action, a soldering action, a marking action, a grinding action, an assembling action, a gluing action, and a fixing action.

18. The automatic robotic arm system according to claim 11, wherein the image capturing device comprises a color camera;
wherein the optical ranging device comprises an infrared rangefinder;
wherein the beam-splitting mirror is a longpass dichroic mirror, and has a visible light reflectivity above 80% and an infrared transmittance above 75%.

19. The automatic robotic arm system according to claim 11, wherein the optical ranging device comprises:
an optical emitter, used to emit the ranging light toward a target;
an optical receiver, used to receive the ranging light being reflected; and
a ranging controller, connected to the optical emitter and the optical receiver, and configured to calculate the target distance based on a transmit-receive time difference of the ranging light, a light propagation speed, and a distance between the optical emitter and the optical receiver.

20. The automatic robotic arm system according to claim 11, wherein the optical path structure comprises a reflector used to reflect the visible light guided from the beam-splitting mirror to the image capturing device.

* * * * *